United States Patent
Stringham

(10) Patent No.: US 7,086,055 B2
(45) Date of Patent: Aug. 1, 2006

(54) COMPUTER SYSTEM AND METHOD FOR INCREASED PROCESSING POWER BY COMMUNICATING WITH NON-COMPUTER DEVICES

(75) Inventor: Gary G. Stringham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 09/921,222

(22) Filed: Aug. 2, 2001

(65) Prior Publication Data

US 2003/0033352 A1   Feb. 13, 2003

(51) Int. Cl.
*G06F 9/46*   (2006.01)
*G06F 9/455*   (2006.01)
*G06F 3/12*   (2006.01)
*H04N 1/00*   (2006.01)

(52) U.S. Cl. .................. 718/102; 718/100; 718/1; 358/1.1; 358/400

(58) Field of Classification Search ........ 718/100–108, 718/1; 709/200–253
See application file for complete search history.

(56) References Cited

U.S. PATENT DOCUMENTS

| | | | | |
|---|---|---|---|---|
| 5,408,470 A | * | 4/1995 | Rothrock et al. | 370/261 |
| 6,321,266 B1 | * | 11/2001 | Yokomizo et al. | 709/226 |
| 6,459,496 B1 | * | 10/2002 | Okazawa | 358/1.14 |
| 6,473,759 B1 | * | 10/2002 | Herrendoerfer et al. | 707/10 |
| 2002/0087881 A1 | * | 7/2002 | Harif | 713/201 |

* cited by examiner

*Primary Examiner*—Meng-Al T. An
*Assistant Examiner*—Kenneth Tang

(57) ABSTRACT

The host computer parses through a task to be performed and generates a sub-task that is to be distributed to a remote peripheral, such as a printer. The task is comprised of data and instructions for execution, such as an executable file. The task is formatted into a packet that is labeled such that the remote peripheral knows that this task is to be performed during the remoter peripheral processor's idle time. The remote peripheral processes the task according to the instructions, captures the results, and transmits the results back to the host computer.

16 Claims, 5 Drawing Sheets

COMPUTER SYSTEM AND METHOD FOR INCREASED PROCESSING POWER BY COMMUNICATING WITH NON-COMPUTER DEVICES

BACKGROUND OF THE INVENTION

The present invention relates generally to networked computer systems and more particularly to a system and method for maximizing the processing bandwidth available in such a computer system.

The concept of using multiple computers to work on the same task is commonly known in the art as "metacomputing" or "distributed computing". Universities, science and research labs, and other places that do heavy computational work need to use all available resources in order to process job requests in a timely manner.

The systems used for these heavy computational tasks help themselves by spreading the work around to other computers on the system. Various different technologies and procedures have been developed that divide up the job requests and give a piece or a job at a time to different computers that process the assigned job and return the results back to the host computer for integration into the job request. Communications between these computers is typically handled with Ethernet network protocol.

It has been common to incorporate printers, scanners, copiers and other similar devices onto the network with other computers. These various peripheral devices communicate using Ethernet network protocol and have operating systems that are, for the most part, POSIX compliant (a standard for operating systems on computers). As is well known in the art, the POSIX standard specifies how an operating system should look to an application and how the application interacts with the operating system.

It was commonly perceived that these peripheral devices were "dead-end devices". In other words, a job request could only be sent to the devices and performed. Recently, the processors, memory, and other computer devices such as hard drives have been significantly upgraded on network devices such as printers, scanners, and copiers. This is in part related to the ever-increasing larger job requests.

However, it is also in part related to the ability of these devices to look like different kinds of devices. In other words, a printer can have the ability to look like different kinds of printers, or take on different personalities. With regards to printers, the two dominant personalities are two different printer languages, PRINTER CONTROL LANGUAGE (PCL) and POSTSCRIPT that are well known in the art.

When a printer receives a print job, one of the first steps it performs is to determine which personality should process the job. After this determination, the appropriate personality processes the job request. Another characteristic of current network devices is the ability to send information or communicate with a host computer. Commonly, this communication would include status updates, results of a print job, and jam or error alerts.

These network devices are not always busy executing tasks. There is frequent idle processing capability between tasks. Therefore, it would be advantageous to maximize the available processing power of a network device such as a printer or scanner using the devices' idle time as an alternate personality that would perform a function different from that originally intended for the device.

SUMMARY OF THE INVENTION

The present invention encompasses a process and system that makes a printer or other device's idle processing bandwidth available to host computers while the printer is idle. A host computer first formulates the idle CPU task. The computer then packetizes the task for transmission to the idle device.

The computer labels, marks, or identifies the packet as an idle task, as opposed to a normal task, for processing by the processor of the device. The packet is then addressed with the address of the device. This may be a network address or some other type of address so that the packet reaches the proper device.

The host computer transmits the packet to the device over the network or direct connection. The device then removes the items in the packet and submits them to the device's processor for generation of a results file. The device transmits the results or a result file back to the host computer.

DETAILED DESCRIPTION OF THE PREFERRED EMBODIMENT

The present invention provides extra processing power for host computers by using the idle time of a peripheral device's central processing unit ("CPU") to perform tasks. Tasks are sent to the idle device, the task is performed, and the results are transmitted back to the host computer.

Figure 1:
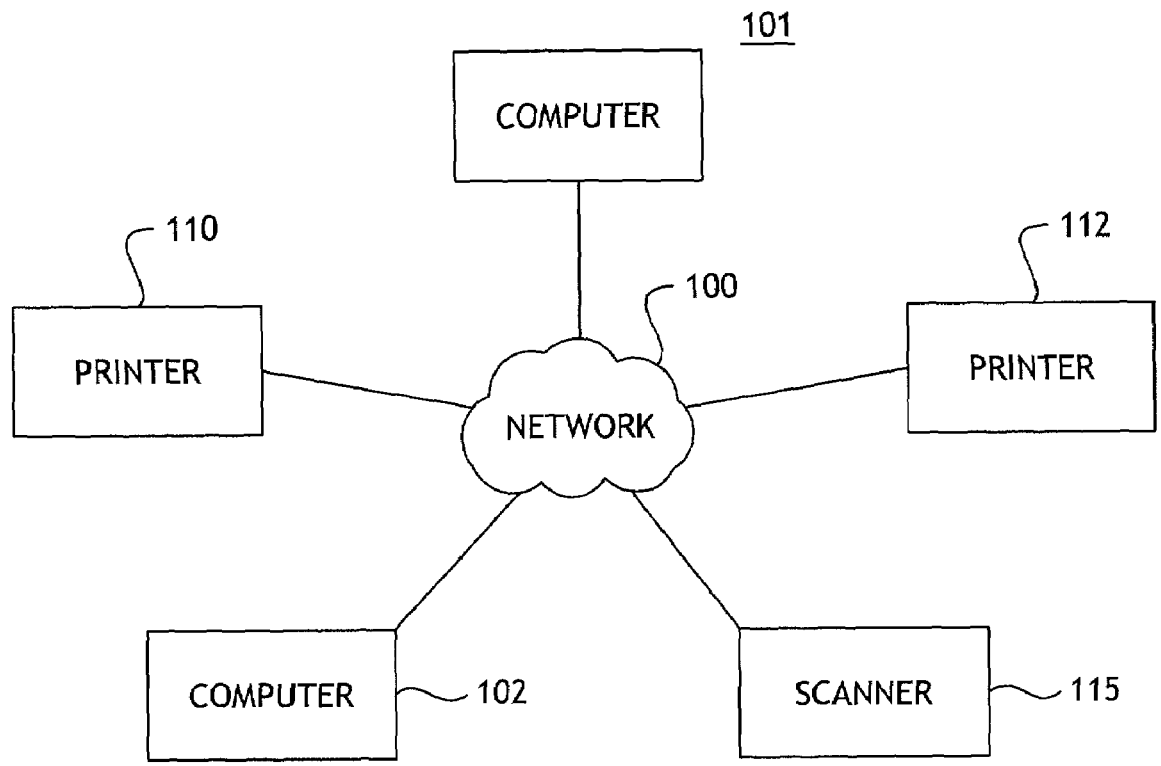
FIG. 1 shows system diagram of a data network in accordance with the present invention.

FIG. 1 illustrates a system diagram of a typical computer data network of the present invention that comprises at least one printer and at least one host computer. This system is comprised of two host computers (101 and 102), two printers (110 and 112), and a scanner (115). The system components are coupled together over a local area network (100).

In one embodiment, this network uses Ethernet protocol for data transmission between the various devices coupled to the network (100). Other embodiments use other types of networks including token ring or any of the various wireless network protocols. The present invention is not limited to any one network standard.

The computer network of FIG. 1 is only one example of the network configurations possible that are encompassed by the present invention. Some network configurations may include large numbers of computers and printers. The network itself may require routers, hubs, and computer servers in order to operate properly under whatever standard is being utilized. If the data were transmitted over a wireless network, the network would be further comprised of base stations, transmitters, and receivers.

In the interest of clarity, these network devices are not shown in FIG. 1 but are assumed to be present, if required by the networking standard, in the network block (100). The operation and architecture of the various networks of the present invention, wireless or wireline, are well known in the art and are not discussed further.

Figure 2:
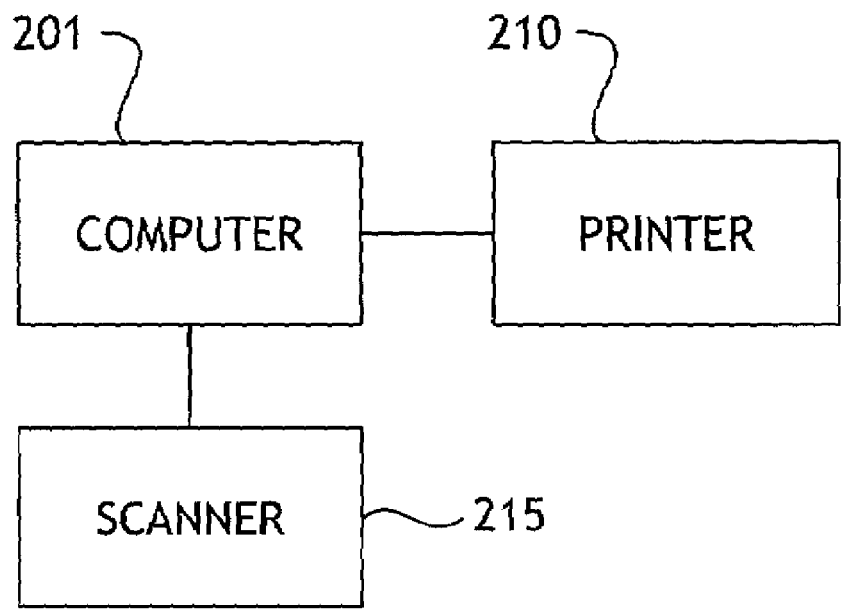
FIG. 2 shows an alternate embodiment data network in accordance with the present invention.

FIG. 2 illustrates an alternate embodiment of the network of the present invention. This network is a greatly simplified version of the network of FIG. 1. The network of FIG. 2 is comprised of a computer (201) that is coupled to a printer (210) and a scanner (215). In this embodiment, the printer (210) and scanner (215) may be coupled to the computer over a Universal Serial Bus (USB), a small computer serial interface (SCSI), a parallel interface, a Firewire interface, or any other type of direct connection to a computer.

Figure 3:
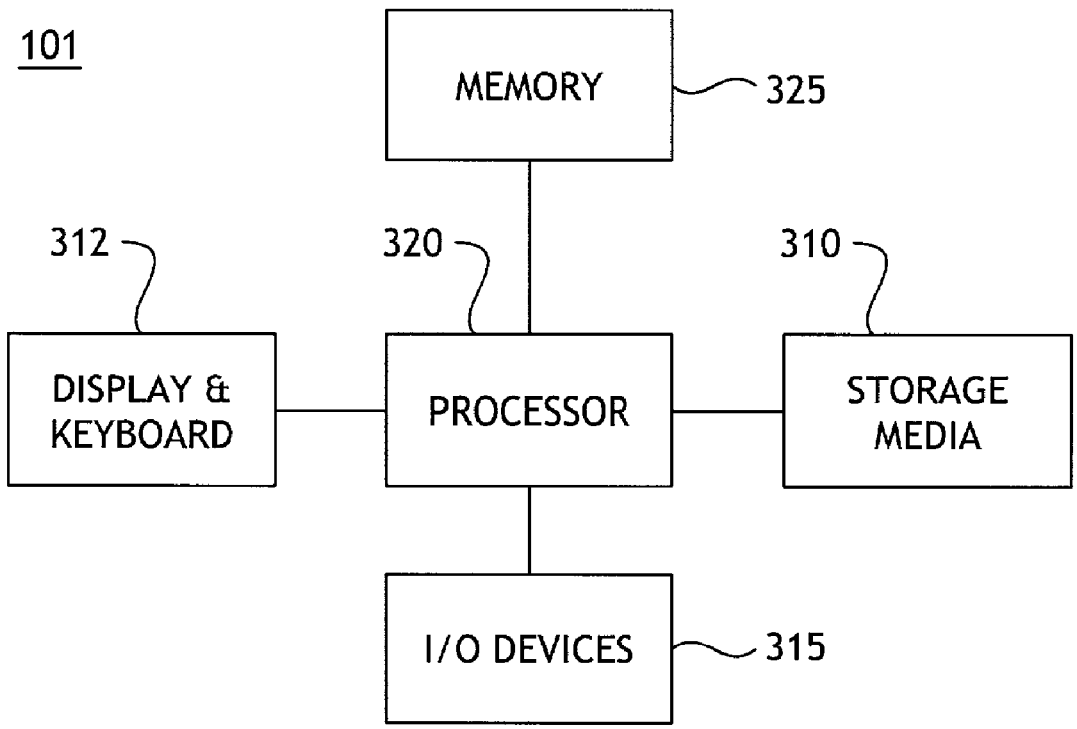
FIG. 3 shows block diagram of a computer in accordance with the present invention.

FIG. 3 illustrates a computer (101) of the present invention. This computer (101) may be a typical personal computer such as those that run the WINDOWS or MACINTOSH operating systems. The computer (101) may also be larger workstation or mainframe computers such as those manufactured by IBM or SUN and running UNIX or some other type of operating system The computer (101) is comprised of a processor (300) that controls the operation of the computer and runs the operating system and various processes and programs of the computer. The processor may be of the POWERPC or PENTIUM type.

The memory (305) is used to store data that is manipulated by the processor (300). The memory (305) may be of the type used for temporary storage of data such as random access memory (RAM). Additionally, the memory (305) may be of the type used for permanent storage of data such as read only memory (ROM) or programmable read only memory (PROM). For example, the computer's BIOS may be stored in the memory block (305).

The processor is also coupled to the storage media (310) that includes the computer's hard disk drives, floppy drives, CD drives, or any other type of drive utilized by the processor. For example, a hard disk drive may contain the operating system used by the processor that governs the operation of the computer (101).

A display and keyboard (312) is used to provide a computer operator with the means for interfacing with the computer (101). The information generated by the processor is displayed on the display while the keyboard is used to input data.

The Input/Output devices (I/O) (315) of the computer (101) are coupled to the processor (300). The I/O devices (315) may include network interface cards, infrared interfaces, radio frequency interfaces, or any other type of interface used to couple the computer to a network or directly to the computer peripherals as illustrated in the embodiment of FIG. 2.

Figure 4:
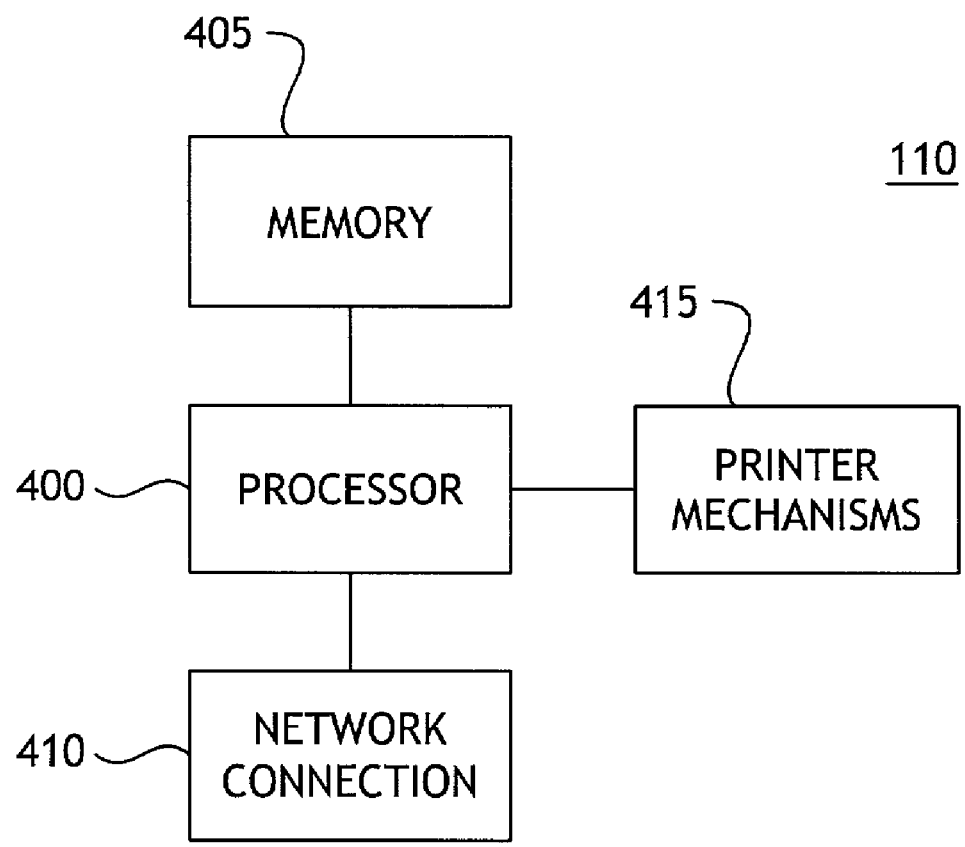
FIG. 4 shows block diagram of a printer in accordance with the present invention.

A block diagram of a typical printer (110) of the present invention is illustrated in FIG. 4. The printer (110) is comprised of a processor (400) that controls the operation of the printer (110). The processor (400) may be of the type described above for the computer or it may be a simpler microcontroller running microcode.

The printer memory (405) is comprised of the RAM, ROM, or other types of memory as described above for the computer. The printer memory (405) is used to store printing tasks that have been sent to the printer from the computer(s) of the network. The memory also stores the tasks to be executed by the processor during the idle time that the printer processor (400) is not executing a print job.

The network connections (410) include any network interface cards required to interface the printer to a network. In another embodiment, the network connection (410) is simply a USB port or other type of port for directly coupling the printer to a computer.

The processor (400) is also coupled to and controls the printer mechanisms (415) of the printer. For example, in an inkjet printer, the printer mechanisms (415) include the inkjet cartridge, the cartridge carriage device, and the roller that feeds the paper into the printer. If the printer is a laser printer, the printer mechanisms (415) may include the toner cartridge, the various feed rollers, the laser mirrors and optics, and the thermal devices required for laser printing. For purposes of this disclosure, the term "printer" (and equivalents identified herein) should be construed as a CPU, any associated memory, mass storage devices, input/output circuitry, network interfaces and any associated software by which computational tasks can be executed.

When a task is distributed to another computer, typically that computer has the compilers, interpreters or other programs required to process the task. A printer, however, does not normally have compilers, interpreters or other programs available to run or execute a function that is not related to printing because it was designed to print. Therefore, all required support processes such as compilers and other programs are preferably to be included in any task transmitted to a printer or other network device. All the printer provides is an operating system. Since the computers and programmers setting up the system know the capabilities of the printers on the network, the computers on a network can be set up to transmit the proper programs (e.g., compilers, interpreters, and other programs) required by the printer to complete the task assigned to it.

Figure 5:
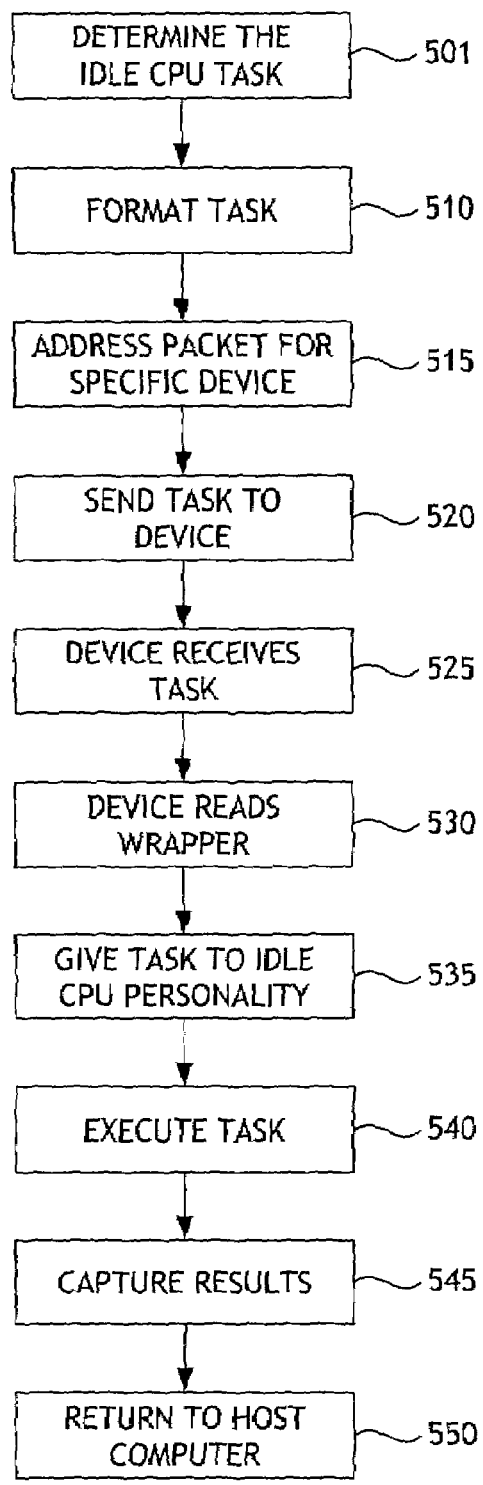
FIG. 5 shows a flowchart of the task transmission process of the present invention.

In the preferred embodiment, the tasks are transmitted from the network computers to the printers in packets of data. The flowchart of FIG. 5 illustrates the process used to transmit the tasks to various printers of the network.

The process starts when a host computer determines that it has a task that it needs to divide up and send to other CPU resources (step 501). An example of a task to be distributed to an idle CPU is the breaking of an encryption scheme. Such a task typically requires trying a large number of alphanumeric combinations. In this example, the host computer distributes a different range of numbers to each idle CPU for processing.

The host computer formulates an idle CPU task to be sent to the printer's idle CPU. The following is one example of a task distributed to a printer's idle CPU in a packet:

| | |
|---|---|
| Attached Files: | encrypt_0342.exe, range_85D.dat |
| Program Execution | encrypt_0342.exe/D/g13–15 range 85D.dat results_25XQ.dat |
| Return File: | results_25XQ.dat |
| Return Address: | encrypt_results@breakencrypt.org |

The above packet describes two attached files: encrypt_0342.exe and range_85D.dat. Both of these files would be sent to the printer for processing along with the above text defining the program execution (e.g., encrypt_0342.exe using range_85D.dat as the data file), the name of the file to be returned to the host computer (e.g., results_25XQ.dat), and the address to which the file is to be returned (e.g., encrypt_results@breakencrypt.org).

The above embodiment is only one example of a task to be distributed to an idle printer. Other tasks that are more complex or less complex are also encompassed by the present invention. Additionally, alternate embodiments may use an IP address instead of an e-mail address for the return of the results file.

The idle task distribution driver of the present invention formats the task packet to be sent to the printer (step 510) and identifies it as an idle CPU job. The idle task distribution driver is substantially similar to a printer driver that is used by a word processor. The driver places the packet into a PRINTER JOB LANGUAGE (PJL) format, including the PJL command.

The PJL command is typically used to tell the printer how to process the print job. The PJL command is well known in the art and is not discussed further.

In one embodiment, the PJL command would appear as: "@PJL LANGUAGE=IDLECPU". At this point, the package appears to the host computer and the printer as a normal print job that is formatted to be sent to the printer.

As part of the preparation of the packet for transmission, the address of the desired printer is placed on the package (step 515). This may be an e-mail address or a TCP/IP address for an Ethernet network. Other embodiments use other forms of addressing.

The task is then transmitted over the network to the printer (step 520) in substantially the same manner as a print job is transmitted to the printer. The transmission of data and print jobs over the network is well known in the art and is not discussed further.

The printer receives the task (step 525) and stores it in memory for execution. The printer's CPU reads the PJL commands and determines that the task is an idle CPU task and not a print job (step 530). The CPU can determine this by the "IDLECPU" in the PJL command.

The task is taken out of the PJL format and given to the idle CPU personality for execution (step 535). The printer typically has multiple personalities or language capabilities in order to execute different print jobs. This gives the printer the ability to appear like different kinds of printers (take on different personalities). The two dominant printer personalities known in the art are PCL and POSTSCRIPT. When the printer receives a print job, one of the first steps is to figure out which language (personality) is necessary in order to process the job.

The PJL specifies how to process the attached job by looking at the PJL command. For example, "@PJL LANGUAGE=PCL" or "@PJL LANGUAGE=POSTSCRIPT".

The process of the present invention invokes the idle CPU personality in the same manner, by sending the PJL command "@PJL LANGUAGE=IDLECPU". The idle CPU reads the packet and determines that there are two files attached: encrypt_0342.exe and range_85D.dat. The printer's CPU then unpacks the attached files and stores them in some directory in the printer's file system. Then it would invoke the program in substantially the same manner as any other program running on the printer (step 540). It would execute the "encrypt_0342.exe" program with the parameters specified in the "range_85D.dat" file by executing the packet line: encrypt_0342.exe/D/g13–15 range_85D.dat results_25XQ.dat.

When the program is completed with the task, the printer's CPU looks in the directory for the file "results_25XQ.dat" (step 545). This file is mailed back to the given return address or sent back over the network using the given network address (step 550), depending on the embodiment. The host computer then uses the "results_25XQ.dat" file for its computations.

The above embodiment assumes that the printer's idle CPU and the host computer's CPU and operating system are compatible. Compatible CPUs and operating systems can run the same programs without problems. For example, if both the host computer and the printer are using PENTIUM CPUs and MICROSOFT WINDOWS, then the programs and data files can be passed between the CPUs without compatibility problems.

If the CPUs and operating systems are not compatible, however, the idle CPU might not be able to understand the files it receives from the host computer. In an alternate embodiment, the host computer and the printer use a generic programming language such as JAVA, if the device has a JAVA Virtual Machine or equivalent.

In the above example, instead of the host computer sending the executable file "encrypt_0342.exe" to the printer, the host computer would put together an idle CPU task using JAVA source code. In this case, the file "encrypt_0342.java" would have been sent instead of the ".exe" file. The JAVA file would then be given to the printer's internal JAVA Virtual Machine for processing. The JAVA Virtual Machine knows how to interpret JAVA source code. JAVA and the JAVA Virtual Machine are well known by those skilled in the art.

In the JAVA embodiment, the results would not be output directly into a data file. In this case, the Virtual Machine would output the results to the printer's CPU and the CPU would either put the results into a packet or formulate the results into text for an e-mail that is sent back as specified in the task request.

Using the JAVA embodiment of the present invention, the idle CPU tasks can be sent from a host computer using a PENTIUM CPU and running MICROSOFT WINDOWS to a printer using a POWERPC CPU and running the MACTINTOSH OS. This alternate embodiment enables any computer to send tasks to the idle CPUs of any printer.

In an alternate embodiment, in order for a host computer to submit work to a printer, the host computer could cross-compile a program for the printer's CPU and operating system. This would allow the host computer and the printer to have different, incompatible CPUs and operating systems while the host computer takes the source code and compiles it into a machine language that the printer can understand. This embodiment would not require the use of JAVA and the JAVA Virtual Machine.

The present invention does not require a new driver in order for the host computer to handle the idle CPU task. The host computer could be running an application or a script to perform the job.

While the present invention is described using the idle CPU of a printer, any device having processing power can implement the processes of the present invention. For example, alternate embodiments include using scanners, plotters, gaming systems (e.g., SONY's PLAYSTATION), and personal digital assistants, all of which should be considered to be equivalent to a printer in the sense that they all have CPUs that can be engaged to perform other tasks. The only requirements for implementing the present invention is that the device has a connection to a network, either wireless or wireline, and that the device has a CPU that can be used for processing while idle.

In yet another embodiment, instead of implementing an idle CPU personality in the printer, the printer may use a separate process to watch a port that is not dedicated to printing. Any task coming in on that port is considered an idle CPU task and is handled according the above described processes.

In the preferred embodiment, the host computers of the present invention use a network to access the idle printers.

Alternate embodiments use other forms of access such as directly through the printer's parallel port, serial port, USB, or an infrared connection.

Additional embodiments do not require the use of the PJL in order for the printer to recognize the idle CPU job. Other techniques are available, such as the dedicated network port discussed above, or a specific I/O channel.

In summary, the system and processes of the present invention enable a host computer to distribute tasks to the CPUs of devices that are idle. The devices perform the tasks and send the completed tasks back to the host computer. This enables the host computer to accomplish more complex tasks without requiring additional processing time.

Numerous modifications and variations of the present invention are possible in light of the above teachings. It is therefore to be understood that within the scope of the appended claims, the invention may be practiced otherwise than as specifically described herein.

What is claimed is:

1. A method for distribution of a task, by a host computer, to a printer, where the printer comprises an operating system that includes a JAVA interpretation process and a processor that executes the JAVA interpretation process and operating system, the printer having an idle state during which printing is not performed, the method comprising the steps of:
    identifying a non-printing task at the host computer where the non-printing task is initially configured to be executed by the host computer and is identified to be distributed to the printer for processing by the printer where the printer functions as a distributed computing device;
    formulating the non-printing task into an executable form comprising JAVA code;
    wrapping task execution instructions and the JAVA code in a packet;
    labeling the packet for processing by the JAVA interpretation process;
    transmitting the packet to the printer for generation of results by the JAVA interpretation process in response to the JAVA code and the task execution instructions; and
    the host computer receiving the results from the printer.

2. The method of claim 1 wherein the packet is transmitted to the printer based on an address where the address is a network address.

3. The method of claim 2 wherein the network address is an Internet protocol address.

4. The method of claim 2 wherein the network address is an Ethernet address.

5. The method of claim 1 further including the step of the host computer transmitting an executable file along with the packet to the printer for use by the printer in order to process the non-printing task.

6. The method of claim 1 wherein the printer identifies the non-printing task as an idle state task in response to a port of the printer over which the packet is received.

7. A computer system for minimizing processing time for processing job requests, including a computer having a processor, memory, and an operating system, the computer system comprising:
    means for parsing tasks from the processing job request that is originally requested to be executed by the computer;
    means for generating a non-printing task, from the processing job request, comprising data and execution instructions configured to allow at least one printing device to execute the non-printing task;
    means for wrapping the non-printing task with a functionality label to form a packet;
    means for transmitting the packet to the at least one printing device for processing by the at least one printing device to generate task results, wherein the at least one printing device having an idle state during which printing is not performed; and
    means for receiving the task results from the at least one printing device.

8. The system of claim 7 and further comprising:
    means for receiving the packet at the at least one printing device;
    means for determining a necessary functionality for processing the non-printing task from the wrapper label;
    means for unwrapping the packet;
    means for processing the non-printing task with the necessary functionality, according to the execution instructions, and generating non-printing task results;
    means for capturing the non-printing task results; and
    means for addressing the non-printing task results for return to a transmitting computer.

9. The computer system of claim 8 wherein the necessary functionality is a JAVA Virtual Machine.

10. The computer system of claim 8 wherein the at least one printing device is one of a printer, a scanner, gaming systems, or a personal digital assistant.

11. The computer system of claim 8 and further including means for storing the non-printing task in memory of the at least one printing device.

12. A computer system for minimizing processing time for large processing job requests, the system comprising:
    a computer having a processing unit and memory that stores programming commands that, when read by the processing unit, causes the processing unit to function to: parse a non-printing printing task from the large processing job request that is awaiting execution by the computer and re-assign the non-printing task for execution by a printing device, wrapping the non-printing task with instructions to form a packet, and transmit the non-printing task and instructions for processing the non-printing task to the printing device in the packet; and
    at least one remote printing device, where a printing device includes a processing unit and memory that stores programming commands that, when read by the processing unit, causes the processing unit of the printing device to function to: receive the packet from the computer, wherein the packet includes the non-printing task and the instructions for processing the non-printing printing task, determine a necessary functionality for processing the non-printing task, unwrapping the packet, and processing the non-printing task with the necessary functionality to generate task results.

13. The computer system of claim 12 wherein the necessary functionality is a JAVA Virtual Machine.

14. The computer system of claim 13 wherein the non-printing task is written by the processor in a code that is interpreted by the JAVA Virtual Machine.

15. The computer system of claim 12 wherein the non-printing task comprises at least one data file.

16. The computer system of claim 12 wherein the non-printing task comprises at least one executable file.

* * * * *

UNITED STATES PATENT AND TRADEMARK OFFICE
CERTIFICATE OF CORRECTION

PATENT NO. : 7,086,055 B2 Page 1 of 1
APPLICATION NO. : 09/921222
DATED : August 1, 2006
INVENTOR(S) : Gary G. Stringham It is certified that error appears in the above-identified patent and that said Letters Patent is hereby corrected as shown below:

In column 8, line 37, in Claim 12, after "non-printing" delete "printing".

In column 8, line 53, in Claim 12, delete "printing" before "task,".

Signed and Sealed this

Twenty-sixth Day of May, 2009

JOHN DOLL
*Acting Director of the United States Patent and Trademark Office*